United States Patent [19]

Wenzel et al.

[11] Patent Number: 4,636,458

[45] Date of Patent: Jan. 13, 1987

[54] STORAGE DISK MADE OF PARA-METHYL STYRENE

[75] Inventors: Franz Wenzel, Darmstadt; Peter J. Arndt, Seeheim-Jugenhe; Werner Siol, Darmstadt-Ebers, all of Fed. Rep. of Germany

[73] Assignee: Röhm GmbH, Darmstadt, Fed. Rep. of Germany

[21] Appl. No.: 803,512

[22] Filed: Dec. 2, 1985

Related U.S. Application Data

[60] Continuation of Ser. No. 661,868, Oct. 16, 1984, abandoned, which is a division of Ser. No. 562,706, Dec. 19, 1983, abandoned.

[30] Foreign Application Priority Data

Dec. 30, 1982 [DE] Fed. Rep. of Germany .... 3248607-4

[51] Int. Cl.$^4$ ................................................ G03C 1/76
[52] U.S. Cl. .................... 430/270; 346/135.1; 346/76 L; 526/313; 526/347.1; 430/246; 430/246; 430/495
[58] Field of Search ............. 526/313, 347.1; 430/270, 296, 495, 246; 346/76 L, 135.1

[56] References Cited

U.S. PATENT DOCUMENTS

| | | | |
|---|---|---|---|
| 3,068,214 | 12/1962 | Rassweiler et al. | 260/87.5 |
| 3,860,556 | 1/1975 | Taylor | 260/42.52 |
| 4,286,049 | 8/1981 | Imamura et al. | 430/296 |
| 4,306,049 | 12/1981 | Propas | 526/347.1 |
| 4,310,919 | 1/1982 | Slaten | 358/128 |
| 4,347,344 | 8/1982 | Ong et al. | 546/347.1 |
| 4,361,506 | 11/1982 | Russo | 526/347.1 |
| 4,362,854 | 12/1982 | Propas | 526/347.1 |
| 4,393,184 | 7/1983 | Tarumi et al. | 526/261 |
| 4,394,438 | 7/1983 | Van Pelt et al. | 430/321 |
| 4,405,708 | 9/1983 | Van Pelt et al. | 430/381 |

FOREIGN PATENT DOCUMENTS

| | | |
|---|---|---|
| 1210189 | 11/1966 | Fed. Rep. of Germany . |
| 2053901 | 5/1971 | Fed. Rep. of Germany . |
| 2089523 | 6/1982 | United Kingdom . |

OTHER PUBLICATIONS

Chemical Week, Feb. 17, 1982, pp. 44–45.
Chem. Abst. 97, 183285g, 12/1982.
Schreyer, *Konstruiren mit Kunststoffen,* Hanser Verlag, Munich, 1972, pp. 169–170.
Patent Abstracts of Japan 7, 160 (P-210) [1305] July 14, 1983.
Polymer Handbook, Brandrup et al., John Wiley & Sons, New York, p. II-437.
Slade et al., Thermal Characterization Techniques, Marcel Dekker Inc., New York, 1970, pp. 42–43.
Guaita et al., Polymer Degradation and Stability, 11 (1985), 167–170.

*Primary Examiner*—Jack P. Brammer
*Attorney, Agent, or Firm*—Curtis, Morris & Safford

[57] ABSTRACT

Homopolymers of para-methylstyrene and copolymers thereof with monomers such as methyl methacrylate, which polymers exhibit very low water absorption in combination with good optical and mechanical properties and are useful for making optically readable data storage disks.

9 Claims, 1 Drawing Figure

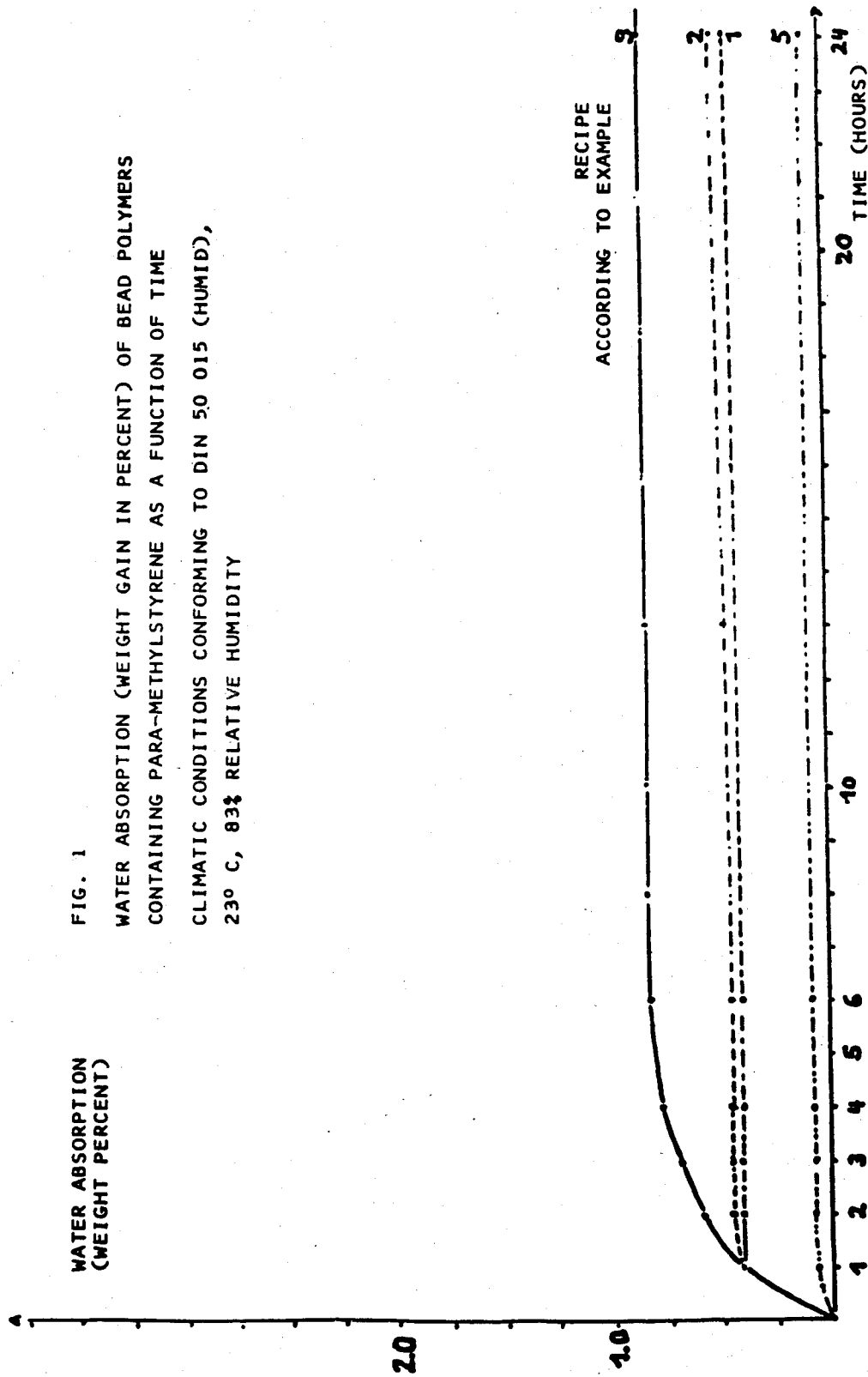

STORAGE DISK MADE OF PARA-METHYL STYRENE

This application is a continuation of Ser. No. 661,868 filed Oct. 16, 1984 now abandoned which is a division of Ser. No. 562,706 filed Dec. 19, 1983, now abandoned.

The present invention relates to polymers exhibiting low water absorption, which polymers are particularly suitable for use as molding compositions.

Among the parameters which usually are considered when the technical suitability of a synthetic resin is being determined, the tendency of the resin to absorb water (hydrophilicity) is generally regarded as unimportant or at most as of minor importance. Exceptions are highly moisture-sensitive polymers such as polyvinyl butyral. In most applications, water absorption, which usually is relatively low, does not pose a problem. Polymethyl methacrylate (PMMA) has a water saturation concentration of about 2 percent, which is not negligible.

In the case of PMMA, difficulties are occasionally encountered when water acts on relatively thin material in a nonuniform manner, as is the case, for example, with aquariums whose walls are too thin. Nonuniform water uptake by the material or the development of a moisture gradient may result in warping or buckling.

German patent publication No. 30 28 498 points to the problems which the development of a moisture gradient can create in the case of optically readable information storage disks comprising PMMA. In that publication, these problems are solved by minimizing the water absorption in the forming operation and in the subsequent processing steps. The undesired effect of nonuniform water uptake by information storage disks (the so-called, "umbrella effect") is also dealt with in U.S. Pat. No. 4,310,919, which seeks to solve the problem by making these disks completely symmetrical. The solutions proposed are plainly directed toward the prevention of the development of a moisture gradient or toward internal compensation for its effects.

Thus, there has been a need for a polymeric material whose optical and mechanical properties permit it to be used as an information storage medium and which poses no problems with regard to water absorption.

This need is met by the polymers produced in accordance with the invention. The polymers in accordance with the invention, exhibiting low water absorption and good optical and mechanical properties, comprise:

(A) 10 to 100 percent of para-methylstyrene, by weight of the polymer and of the monomer mixture from which it is prepared, optionally together with (B) 0 to 50 percent by weight of one or more monomers which contain an aromatic group and have the formula

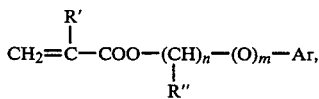

wherein
R' is hydrogen or methyl,
R'' is hydrogen or alkyl having from 1 to 7 carbon atoms,
Ar is phenyl optionally substituted with alkyl having from 1 to 4 carbon atoms n is an integer from 0 to 6, and
m is 0 or 1, but m and n must not both be 1 and if n is 0, then m must also be 0;

(c) 0 to 20 weight percent of one or more aromatic vinyl compounds of the formula

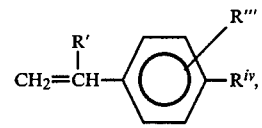

wherein
R' is hydrogen or methyl,
R''' is hydrogen or alkyl having from 1 to 4 carbon atoms, and
R$^{iv}$ is hydrogen or alkyl having from 2 to 4 carbon atoms;

(D) 0 to 80 percent of methyl methacrylate;
(E) 0 to 50 weight percent of one or more monomers of the formula

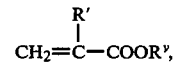

wherein
R' has the meaning given above and
R$^v$ is linear or branched hydrocarbon having from 1 to 20 carbon atoms, or cyclic, nonaromatic hydrocarbon having at least 5 ring carbon atoms and up to 12 carbon atoms, but R' and R$^v$ must not both be methyl;

(F) 0 to 30 percent, preferably 0.5–20 percent, of further different copolymerizable comonomers whose solubility does not exceed 50 g of monomer per liter of water at 25°C.; whereby the comonomers are selected from the group consisting of α-olefins, halogen containing olefins, esters of unsaturated dicarboxylic esters and vinyl esters of saturated carboxylic acids with 3 to 8 carbon atoms in the acid portion, (G) 0 to 10 weight percent, preferably 0,1 to 7 percent, of still further different monomers, which enhance polymer cohesion and are selected from the group consisting of acrylonitrile and methacrylonitrile and crosslinking monomers having in the molecule more than one group capable of polymerizing und free radical polymerizing conditions, but wherein the amount of monomers containing aromatic groups is at least 10 percent of the total weight of the polymer or monomers. Particularly preferred are polymers containing from 10 to 90 percent, and more particularly from 20 to 80 percent, by weight of para-methylstyrene (pMS). (Component A.)

Good copolymerizability of the monomers with esters of acrylic and methacrylic acid, and particularly with component D, methyl methacrylate (MMA), is of special importance in connection with the present invention. Copolymers of MMA and pMS are particularly advantageous.

The polymers may further contain amounts of polymers of the type of components B, C, E, F and G. Type B monomers contain phenyl or alkylated phenyl. Among these monomers are, for example, phenyl acrylate and methacrylate, benzyl methacrylate and acrylate, xylyl methacrylate and acrylate (and particularly the meta form), 4-methylphenyl methacrylate and acrylate, 2-phenylethyl methacrylate and acrylate, 3-phenyl- 1-propyl methacrylate and acrylate, and 2-phenylhydroxyethyl acrylate and methacrylate.

Preferably the sum of the monomers of type (B), (D) and (E) is in the range of 10 to 90 percent, more preferably 20 to 80 percent of all monomers present. The sum of all monomers (A) to (G) in each case being 100 percent.

Component A (para-methylstyrene) may be partly replaced by type B monomers. As a rule, these B monomers should represent less than 50, and preferably from 0.5 to 20, percent of the total weight of the monomers or polymer.

Styrene or substituted derivatives of styrene, for example para-ethylstyrene, meta- or ortho-methylstyrene, alpha-methylstyrene, and other alkyl substituted monomers are suitable for use as type C monomers. As a rule, these monomers should represent less than 20, and preferably less than 10, percent of the total weight of the monomers or polymers. Meta-methylstyrene is particularly well suited.

The total amount of the aromatic monomers should be at least 10, and preferably at least 20, percent of the total weight of the monomers.

The other monomer components, E, F, and G, may be copolymerized especially for the purpose of influencing the mechanical properties and/or the heat resistance of the resulting resin. These monomers will generally total less than 50, and normally less than 40, percent of the weight of the monomers.

Of interest as E type monomers are esters wherein $R^v$ is butyl, and more particularly isobutyl, isopropyl, n-propyl, ethyl, methyl, or cyclohexyl.

The type F monomers which may be included should be monomers which are different from monomers A-E and should have a solubility of less than 50 g of monomer per liter of water at 25° C. These monomers are selected from the group consisting of α-olefins such as butadiene, isoprene and isobutylene, halogen containing olefins such as vinylidene chloride, esters of unsaturated dicarboxylic esters such as esters of itaconic, maleic and fumaric acids and particularly their methyl and ethyl esters and vinylesters of saturated carboxylic acids with three to eight carbon atoms in the acid portion. The type F monomers are added to improve mechanical properties of the resulting polymer in particular flexibility.

They may represent from 0 to 30, and preferably from 0 to 10, percent of the total weight of the monomers (or of the polymer prepared therefrom).

In addition, small amounts (generally less than 10 weight percent) of monomers not named under A to E, which enhance polymer cohesion may be optionally included (Type G monomers). They are selected from the group consisting of acrylonitrile and methacrylonitrile and crosslinking monomers having in the molecule more than one group capable of polymerizing free radically, for example divinyl benzene, acrylic and methacrylic esters of polyols such as butandiol dimethacrylate, moreover the vinyl-, allyl and crotylesters of acrylic and methacrylic acids.

The inclusion of comonomers adding to polymer cohesion is particularly favorable whenever the resulting polymer needs to be protected against organic solvents.

As a rule, the monomers of B-G should be selected so that the glass transition temperature of the resulting polymer will not be below 70° C., and especially will not be below 80° C. (c.f. Kunststoff-Handbuch: ["Plastics Handbook"]Ed. R. Vieweg and F. Esser, Vol. IX, Hanser-Verlag, München 1975, pp. 333–340 and T. G. Fox, Bull. Am.Phys. Soc. 1, 123 (1956)).

The polymers of the present invention are distinguished by very low water absorption, i.e. by low hydrophilicity.

The amount of water absorption can be determined on molded articles produced from the polymers, for example. However, water absorption is advantageously determined on the polymers, for example directly on bead polymers or on a polymer reduced to a particle size of less than 1 mm.

The term water absorption as used in the present specification shall denote the maximum gain in weight of a given polymer specimen in the dried state when exposed to standardized climatic conditions (with 83 percent relative humidity at 23° C. in conformity with DIN 50 015 (humid) after 24 hours as such period of time will suffice to provide for maximum gain in weight in any case. In practice it has been observed that a small sized sample after 6 hours exposure has already attained it s maximum gain in weight. The dried state of a specimen is attained by drying it at least for 24 hours at 60° C.

The water content after 24 hour storage under standardized climatic conditions has been additionally determined by Karl Fischer titration. The weight gain values and water content values according to the Karl Fischer method generally were in good agreement. (See Table I.)

FIG. 1 of the accompanying drawings shows the water absorption of bead polymers containing para-methylstyrene as a function of time under the aforementioned standard conditions. Absorption is measured as the gain in weight of the samples under these conditions. The polymers tested are those described more in detail below in Examples 1, 2, 3 and 5.

Because of the large surface area of a bead polymer or of a comminuted bulk polymer, saturation concentration is already reached after 6 hours under standardized conditions.

The mechanical properties of the polymers of the invention generally are fully satisfactory. For example, the impact strength of a copolymer of 50 percent by weight of paramethylstyrene and 50 percent by weight of methyl methacrylate (for example, a polymer according to Example 4) is 12 mm N/mm² and its Vicat softening temperature (determined in conformity with DIN 53 460) is 99° C. In addition, the material exhibits outstanding light transmission. The density of this copolymer is 1.10 g/cm³.

The polymers of the invention are suitable for a number of uses, especially where low water absorption coupled with good optical and mechanical properties is required.

The combination of these properties of low water absorption and good optical properties united with good mechanical properties and a low specific weight is what accounts for the remarkable usefulness of polymers containing para-methylstyrene. As mentioned earlier, these requirements are especially pertinent to storage media for information that is to be read optically, and more particularly to optical storage disks.

The polymers of the invention are well suited for the manufacture of such storage media, particularly optical storage disks. They lend themselves especially well to the manufacture of data storage disks, particularly of the types designated DOR (Digital Optical Recording).

The storage capacity of such disks usually is very high and may range from $10^9$ to $10^{11}$ bits, for example. Processing can be done conventionally, for example by casting or by the use of a molding composition. It is also possible to produce such information storage disks by extrusion or especially by injection molding. Moreover, these storage disks for optically readable information can also be produced directly by the polymerization of para-methylstyrene or of monomer mixtures containing para-methylstyrene.

The polymers of the invention are produced by free radical initiated polymerization by conventional methods.

In principle, the polymerization of para-methylstyrene or of comonomers containing para-methylstyrene can be carried out by such known techniques as bulk, suspension, emulsion, or solution polymerization.

In suspension polymerization, the polymer solids can be isolated simply by filtering off the beads, followed by washing and drying. In emulsion polymerization, isolation is by precipitation, freeze coagulation, or spray drying, for example. In solution polymerization, the polymer solids can be separated by precipitation, for example in a nonsolvent such as methanol.

Bulk and suspension polymerization are particularly preferred, since here the solid polymer is obtained by a direct route.

Especially in polymerization with a high paramethylstyrene content, it may be advantageous not to carry the polymerization to complete conversion, but only to about 80 percent conversion, in order to prevent branching. Isolation of the polymer then is effected by precipitation in a non-solvent or by venting.

As a rule, polymerization is initiated by means of free radical initiators such as organic peroxides and peresters such as dibenzoyl peroxide or tert-butyl-per-2-ethylhexaneoate, or else using azo compounds such as azoisobutyronitrile, or other initiators.

For regulation of the molecular weight, such polymerization regulators as tert-dodecyl mercaptan, 2-ethylhexyl, thioglycolate, etc., are generally used.

Quite generally, the polymerization methods known for use with styrene and its copolymerization with other monomers can be employed. In this connection, reference is also made to Houben-Weyl, Methoden der Organischen Chemie ("Methods of Organic Chemistry"), 4th ed., vol. 14/1.

For the production of molded articles to be used as storage media for optically readable information, para-methylstyrene or monomer mixtures containing para-methylstyrene can be polymerized either directly, by the use of heat, or with the aid of an initiator and optionally of a redox component. It is possible in certain cases to start out from a monomer/polymer system. As a rule, however, molded articles will be produced by compression molding, by injection molding, or by extrusion, followed by the release of the molded article. In addition, shaped articles can be produced by pressing. Thus a molding composition can be processed by various techniques.

While the polymer, on the other hand, should be readily processable, which calls for a low molecular weight, the degree of polymerization should not be below a certain minimum since otherwise the material will be too brittle. Thus, as a rule, molecular weights greater than 50,000, and more particularly greater than 70,000, are required. However, especially when the compositions are used in extrusion or in injection molding, excessively high molecular weights ($>10^6$) should be guarded against since otherwise increased birefringence might be encountered. In general, the birefringence of a shaped article made from a polymer of the invention should be such that the difference in the optical paths of a light beam passing through said article is less than 100 nanometers, and preferably less than 30 nanometers.

A minimum light transmission is essential, particularly when the material is to be used to store optically readable information. That minimum depends, of course, on the type of light used to read the information. It follows that the basic material should have extremely low intrinsic- or self-absorption. As a general rule, the light transmission of the material, as determined on a plate 3 mm thick, should be greater than 80 percent, and preferably than 85 percent. With regard to the measurement of transmission, reference is made to DIN 5036.

A better understanding of the present invention and of its many advantages will be had by referring to the following specific Examples, given by way of illustration.

EXAMPLE 1

Polymerization in bead form

The data given in Houben-Weyl, Methoden der Organischen Chemie, 4th ed., vol. 14/1, Chap.II, apply to the bead polymerization of para-methylstyrene or of monomer mixtures containing para-methylstyrene.

In addition to high molecular weight dispersing agents such as polyvinyl alcohol or the sodium salt of a styrene/maleic acid copolymer, powdered dispersing agents may be used, for example aluminium hydroxide produced in situ. (c.f. Houben-Weyl, loc.cit., vol. 14/1, pp. 406-429).

In a batch of 1,000 ml of distilled water containing one of the above dispersing agents, a mixture of monomer, regulator, and initiator consisting of:
- 245 g of para-methylstyrene,
- 5 g of meta-methylstyrene,
- 250 g of methyl methacrylate,
- 7 g of 70 % benzoyl peroxide, and
- 3 g of 2-ethylhexyl thioglycolate is agitated for 10 hours at 80° C.

Care should be taken to prevent a lowering of the pH value (because of partial hydrolysis of the benzoyl peroxide) to the point where the dispersing agents are inactivated.

On completion of the polymerization, the batch is cooled and the bead polymer is washed with distilled water and dried. Free flowing, clear polymer beads are so obtained.

The water absorption of the polymers is advantageously determined directly on the beads. (See Table I and FIG. 1)

For the production of injection molded plates, the beads are first granulated to uniform particle size. A granulate of uniform particle size is used also in the production of extrudates. The impact strength of these polymers is 12 mm N/mm$^2$. With regard to the water absorption of the bead polymers, see Table I.

Polymer beads of the above type are used for producing injection molded plates 2 mm thick. Their Vicat softening temperature (determined in conformity with IS 306 or DIN 53460) was found to be 99° C. Light transmission of those plates (DIN 5036) in the range of between 500 to 700 nm was >85 percent. The difference in optical paths determined with those 2 mm plates is well below 10 nm (i.e. Δn <5·10−6)

EXAMPLE 2

The procedure of Example 1 is used, but with a different monomer composition:
250 g of para-methylstyrene,
50 g of methyl acrylate,
200 g of methyl methacrylate,
7 g of 70 % benzoyl peroxide, and
3 g of 2-ethylhexyl thioglycolate.

Polymerization is carried out for 12 hours at 80° C. With regard to the water absorption, see Table I.

Vicat softening temperature (DIN 53460 or IS 306) is 92° C. Light transmission of an injection molded plate 2 mm thick (c.f. example 1) in the range of between 500 and 700 nm is >85 percent. The difference in optical paths with those plates is <10 nm.

EXAMPLE 3

The same polymerization recipe is used as in Example 1, except that the following monomer composition is chosen:
400 g of methyl methacrylate,
100 g of para-methylstyrene,
4 g of 70 % benzoyl peroxide, and
3 g of 2-ethylhexyl thioglycolate.

The batch is polymerized for 5 hours at 8° C. and then for 1 hour at 90° C. With regard to the water absorption, see Table I.

Vicat softening temperature (DIN 53460 or IS 306) is 100° C. The optical properties of an injection molded plate 2 mm thick are. Light transmission in the range of 500 to 700 nm: >90 percent. Difference in optical paths:<10 mm.

EXAMPLE 4

Polymerization in bulk

The polymerization of a monomer mixture comprising 800 g of para-methylstyrene, 800 g of methyl methacrylate, and 1 g of tert-dodecyl mercaptan is carried out at a temperature ranging from 60° C. to 90° C. with the aid of initiator blends such as lauroyl peroxide/benzoyl peroxide. If the polymerization is carried out at a temperature above 90° C, initiators decomposing at an appropriately higher temperature should be used. The polymerization may be performed to yield the desired shaped articles directly. In this way, shaped articles having low birefringence (for example, a difference in optical paths of less than 10 nm) can be produced particularly easily.

EXAMPLE 5

Polymerization in bulk

The same procedure is used as in Example 4, except that para-methylstyrene alone is used in place of a monomer mixture. Polymerization time: 48 hours. Temperature range: 70° C. to 100° C. (Regulator: 0.05 wt. % of tert-dodecyl mercaptan.)

The polymer is ground and then analyzed. Water absorption: 0.06 wt. % (as determined on the basis of the gain in weight after 24 hours) under standardized climatic conditions in conformity with DIN 50 015 (humid): 23° C., 83% relative humidity.

EXAMPLE 6

Polymerization in bulk stopping short of complete conversion of monomers.

A mixture of monomer, regulator and initiator consisting of
80 g of methyl methacrylate,
64 g of para-methylstyrene,
16 g of styrene,
0.2 g of dodecyl mercaptane,
0.2 g of dilauroyl peroxide,
0.2 g of dibenzoyl peroxide,
whilst under nitrogen is polymerized at 80° C. up to 40 percent based on the monomers. The polymer solution is diluted with methylenchloride and the polymer is precipitated by dropwise addition of a tenfold amount by weight of ethanol. The mixture is evaporated to dryness on a vacuum pump. The water absorption (measured directly with the precipitate) is 0.45 percent by weight.

Vicat softening temperature (DIN 53 460 or IS 306) is 94° C. Light transmission in the range of between 500 and 700 nm is >80%; difference in optical paths is <10 nm.

EXAMPLE 7

The same procedure is used as in example 6 except for differences in the monomer composition:
100 g of methyl methacrylate,
40 g of para methylstyrene,
20 g of 3-phenyl propyl methacrylate.

Polymerization as in example 6 was carried to 40 % conversion of monomers. The polymer is precipitated with methanol and is dried as in example 6. The water absorption as measured with the precipitate is 0.78 percent by weight.

Vicat softening temperature of a pressed plate 2 mm thick is 89° C.; Light transmission in the range of between 500 and 700 nm is >90%, difference in optical paths is <10 nm.

EXAMPLE 8

A polymer is produced, which will serve as an information disc for optical reading directly utilizing cross linking monomers. The same procedure is used as in example 4 except that there is no regulator present and the monomer composition is a different one:
70 percent by weight of para-methyl styrene
0.2 percent by weight of butanediol dimethacrylate
29.8 percent by weight of methyl methacrylate The above mixture of monomers is polymerized in a mold to give a disc approximately 1.8 mm thick.

Properties of the 1.8 mm disc.

Water absorption at standard conditions: 0.3 percent by weight Vicat softening temperature: 102° C.; light transmission in the range of between 500 and 700 nm: >85%; difference in optical paths <3 nm.

TABLE I

Characterization of copolymers containing para-methylstyrene

| | Polymer composition (wt. %) | | | | Water absorption* (%) | |
|---|---|---|---|---|---|---|
| Example | pMS | mMS | MMA | MA | Grav.** | K.F.*** |
| 1 | 49 | 1 | 50 | — | 0.45 | 0.42 |
| 2 | 50 | — | 40 | 10 | 0.50 | 0.46 |
| 3 | 20 | — | 80 | — | 0.86 | 0.84 |

TABLE I-continued

Characterization of copolymers containing para-methylstyrene

| Example | Polymer composition (wt. %) | | | | Water absorption* (%) | |
|---|---|---|---|---|---|---|
| | pMS | mMS | MMA | MA | Grav.** | K.F.*** |
| 4 | 50 | — | 50 | — | 0.48 | |

Key:
pMS = para-methylstyrene
mMS = meta-methylstyrene
MMA = methyl methacrylate
MA = methyl acrylate
*Climatic conditions: DIN 50 015 (humid): 23° C., 83% relative humidity.
**Determined gravimetrically.
***Determined by the Karl Fischer method.

What is claimed is:

1. A storage disk for optically readable information, said disk including a layer of a transparent polymer wherein optically readable information has been entered for storage in a surface of said polymer layer by casting, molding, injection molding, or extruding said polymer, said polymer having low absorptive capacity for water, a molecular weight greater than 50,000 and less than $10^6$, whereby the polymer exhibits low birefringence such that the difference in the optical pattern of a light beam passing through said layer is less than 100 nanometers, said polymer consisting of:

(A) 10 to 100 percent by weight of para-methylstyrene,
(B) 0 to 50 percent by weight of at least one monomer of the formula

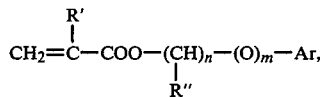

wherein
R' is hydrogen or methyl,
R" is hydrogen or alkyl having from 1 to 7 carbon atoms,
Ar is phenyl or phenyl substituted with alkyl having from 1 to 4 carbon atoms
n is an integer from 0 to 6, and
m is 0 or 1, but wherein m and n must not both be 1 and, if n is 0, then m must also be 0,
(C) 0 to 20 percent by weight of at least one compound of the formula

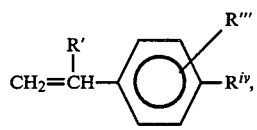

wherein
R' is hydrogen or methyl,
R''' is hydrogen or alkyl having from 1 to 4 carbon atoms, and
$R^{iv}$ is hydrogen or alkyl having from 2 to 4 carbon atoms;
(D) 0 to 8 weight percent of methyl methacrylate;
(E) 0 to 50 weight percent of at least one monomer of the formula

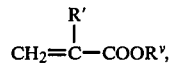

wherein
R' is hydrogen or methyl and
$R^v$ is linear or branched hydrocarbon having from 1 to 20 carbon atoms, or is cyclic, nonaromatic hydrocarbon having at least 5 ring carbon atoms and up to 12 carbon atoms, but wherein R' and $R^v$ must not both be methyl;
(F) 0 to 30 weight percent of further different copolymerizable comonomers whose solubility does not exceed 50 g of monomer per liter of water at 25° C., whereby the comonomers are selected from the group consisting of α-olefins, halogen containing olefins, esters of unsatured dicarboxylic acids and vinyl esters of saturated carboxylic acids having three to eight carbon atoms in the acid portion, and
(G) 0 to 10 weight percent of still further different copolymerizable monomers which enhance polymer cohesion and are selected from the group consisting of acrylonitrile and methacrylonitrile and crosslinking monomers having in the molecule more than one group capable of polymerizing under free radical polymerizing conditions, the sum of all monomers (A) through (G) in each case being 100 percent.

2. A disk as in claim 1 wherein the water absorption of said polymer is less than 1 percent by weight.

3. A disk as in claim 1 wherein the water absorption of said polymer is less than 0.8 percent by weight.

4. A disk as in claim 1 wherein the water absorption of said polymer is less than 0.5 percent by weight.

5. A disk as in claim 1 wherein the birefringence of said transparent data storage layer is such that the difference in the optical pattern of a light beam passing through said article is less than 30 nanometers.

6. A disk as in claim 1 wherein said polymer has a glass transition temperature above 70°C.

7. A disk as in claim 1 wherein said polymer has a glass transition temperature above 85°C.

8. A disk as in claim 1 wherein said polymer has a light transmission greater than 80 percent when measured on a specimen 3 millimeters thick.

9. A disk as in claim 1 wherein said polymer comprises monomers (B), (D), and (E) in an amount whose sum is from 10 to 90 percent of the total weight of all the monomers.

* * * * *